United States Patent
Immendorf et al.

(10) Patent No.: US 7,236,804 B2
(45) Date of Patent: Jun. 26, 2007

(54) METHOD OF SUPPORTING VOICE-BAND MODEM-TO-MODEM CALLS IN A WIRELESS COMMUNICATION SYSTEM

(75) Inventors: Chaz Immendorf, Duvall, WA (US); Eamonn Gormley, Seattle, WA (US); Arun Naidu, Woodinville, WA (US)

(73) Assignee: SR Telecom, Inc., Montreal (CA)

( * ) Notice: Subject to any disclaimer, the term of this patent is extended or adjusted under 35 U.S.C. 154(b) by 184 days.

(21) Appl. No.: 10/620,912

(22) Filed: Jul. 15, 2003

(65) Prior Publication Data

US 2005/0014532 A1 Jan. 20, 2005

(51) Int. Cl.
*H04M 1/00* (2006.01)

(52) U.S. Cl. .................. 455/557; 455/422.1; 455/559; 370/401

(58) Field of Classification Search ................ 455/557, 455/426.1; 370/401, 519, 280; 375/260, 375/222; 405/87; 379/93.32
See application file for complete search history.

(56) References Cited

U.S. PATENT DOCUMENTS

| | | | | |
|---|---|---|---|---|
| 5,351,234 A | * | 9/1994 | Beierle et al. | ............... 370/307 |
| 5,577,863 A | * | 11/1996 | Nottle | ........................ 405/87 |
| 6,262,991 B1 | * | 7/2001 | Dyke et al. | .................. 370/420 |
| 6,577,863 B2 | * | 6/2003 | Bourlas et al. | ............. 455/424 |
| 6,850,512 B1 | * | 2/2005 | Bishop et al. | ............... 370/342 |
| 2001/0046259 A1 | * | 11/2001 | Abrishami | .................. 375/222 |
| 2002/0141355 A1 | * | 10/2002 | Struhsaker et al. | ......... 370/280 |
| 2003/0182556 A1 | * | 9/2003 | Sunder et al. | ............... 713/176 |
| 2004/0120412 A1 | * | 6/2004 | Banerjea | ..................... 375/260 |
| 2004/0125824 A1 | * | 7/2004 | Preston et al. | .............. 370/519 |
| 2004/0146148 A1 | * | 7/2004 | Olafsson et al. | ......... 379/93.32 |
| 2004/0209614 A1 | * | 10/2004 | Bright et al. | ............. 455/426.1 |
| 2005/0089052 A1 | * | 4/2005 | Chen et al. | .................. 370/401 |

* cited by examiner

*Primary Examiner*—Joseph Feild
*Assistant Examiner*—Phuoc Doan
(74) *Attorney, Agent, or Firm*—Bingham McCutchen LLP

(57) ABSTRACT

A method of supporting voice-band modem-to-modem calls in a wireless communication system is disclosed. In some embodiments, once a modem call is detected, the modem call is terminated. Data in the terminated modem call is then demodulated and relayed from one end of a wireless broadband channel to the other end of the wireless broadband channel. Transfer of the data to the second modem is completed when the other end of the wireless broadband channel places a modem call to the second modem. By sending data in high-rate modem calls via a wireless broadband channel rather than over multiple, dedicated wireless voice channels, resources of the wireless communication system are utilized more efficiently that can result in significant gains in system capacity.

36 Claims, 9 Drawing Sheets

METHOD OF SUPPORTING VOICE-BAND MODEM-TO-MODEM CALLS IN A WIRELESS COMMUNICATION SYSTEM

BACKGROUND OF THE INVENTION

1. Field of the Invention

The present invention is related to wireless communication systems. More particularly, the present invention is directed to a method of supporting voice band modem-to-modem calls in a wireless communication system.

2. Related Art

Telecommunication providers often employ wireless communication technology as a cost-effective means of connecting a customer/end-user location (such as a residence or business) to the provider's network (historically the local voice switch). In the past, this connection typically consisted of a twisted-pair copper wire that supported voice-band services, such as voice calls, fax calls, and voice-band modem calls. These voice-band services are typically carried on circuit-switched channels. When using wireless communications technology as a replacement for or an alternative to copper wire, it is desirable for the wireless link to support the same set of voice-band services as the copper link as well as high bandwidth broadband data services. High bandwidth broadband data services are typically carried on packet-switched channels.

Due to bandwidth constraints caused by limited wireless spectrum availability and/or the extremely high cost of acquiring spectrum rights, wireless communication systems that provide voice access typically utilize voice coding to reduce the bandwidth required by a voice call. Researchers have made significant strides in recent years that allow systems to provide high-quality voice transmissions at very low data rates. A difficult dilemma, however, exists for the creators of wireless technology: How does one enable high-rate voice-band modems, with speeds of up to 56 kilobits per second (kbps), to use a system designed for low-rate voice transmissions, with speeds that may be below 16 kbps?

One solution is to use a tone detector to determine when a voice-band modem session is active. When a modem call is detected, multiple low-rate voice channels are combined together and assigned to that call, such that sufficient bandwidth is provided to support the higher-rate modems. The number of channels that are combined depends upon the modulation standard of the modems and the voice coding of the system. For example, if the modems are using the V.34bis standard with transmission speeds of up to 33.6 kbps and the system employs a 16 kbps voice coder and has 16 kbps wireless voice channels, a minimum of three channels must be combined for there to be sufficient bandwidth to support a modem call. Oftentimes, lower rate voice channels are combined into a 64 kbps channel that carries μ-law or A-law encoded Pulse Code Modulation (PCM) data to support voice-band modem services.

There are, however, several drawbacks to the above approach. One drawback is that the combined channels are dedicated (i.e., the assigned channels are not used for other communications) for the duration of the modem call. This results in a reduction in the total system capacity with every active modem call. Another drawback is the fact that a significant portion of the bandwidth of the combined channels is often times wasted. For instance, in the example above, the modem call may only utilize 33.6 kbps of the 48 kbps-bandwidth of the combined three voice channels, which is a waste of 14.4 kbps or 30% of the bandwidth.

In addition, data traffic is inherently 'bursty'. For example, if a user has dialed into a modem server and is browsing the Internet, data transfers only take place after the user clicks on a web link. After a web page has been downloaded, other data transfers usually do not take place. With the above solution, however, the voice channels are still assigned to the call. This results in further waste of airlink resources. Thus, there is a need for a wireless communication system that supports both low-rate voice channels and high-rate voice-band modem access without changing voice capacity regardless of the number of active voice-band modem calls.

SUMMARY OF THE INVENTION

The present invention provides a method of supporting voice-band modem-to-modem calls in a wireless communication system. In some embodiments, a call from a first modem to a second modem is detected. The modem call is then terminated. Data in the terminated modem call is demodulated and relayed over a wireless broadband channel to the other end of the wireless broadband channel. The other end of the wireless broadband channel will then complete the transfer of data to the second modem by establishing a separate connection to the second modem. By sending data in high-rate modem calls over a wireless broadband channel rather than via multiple, dedicated wireless voice channels, resources of the wireless communication system are utilized more efficiently, which results in significant gains in system capacity.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Support of voice-band modem-to-modem calls in a wireless communication system is disclosed. Rather than combine multiple low-rate voice channels to support high-rate modem calls, which can result in substantial reduction in system capacity, modem data is relayed over a wireless broadband channel instead. This optimizes the allocation of system resources and yields significant gains in system capacity.

Figure 1:
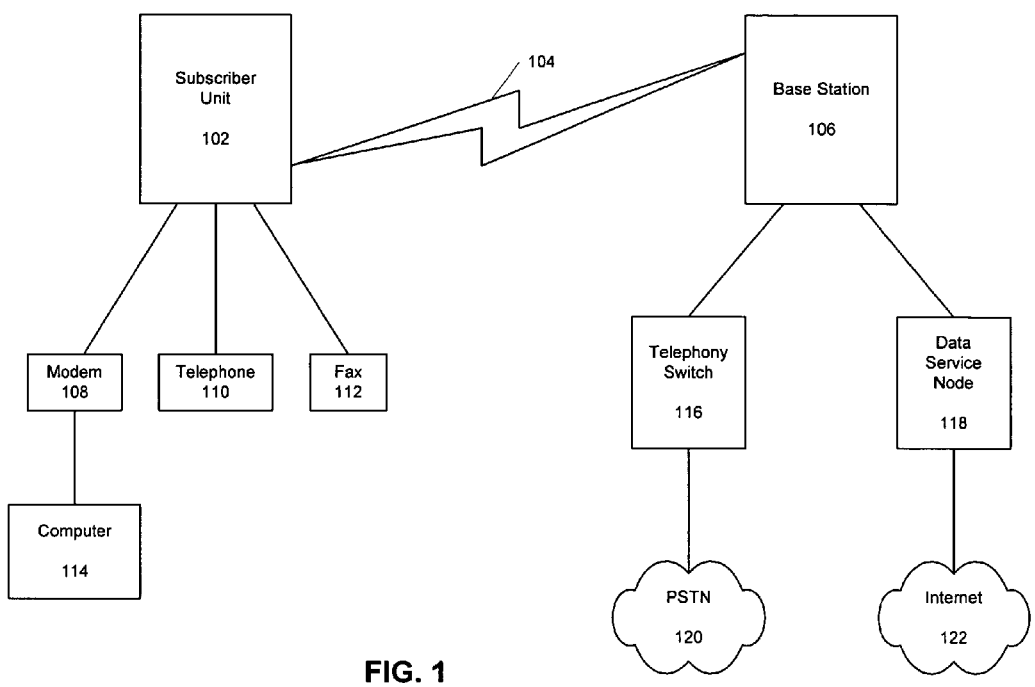
FIG. 1 is a top-level architecture diagram of a wireless communication system according to some embodiments of the invention.

FIG. 1 shows a top-level architecture diagram of a wireless communication system 100 according to some embodiments of the invention. System 100 includes a subscriber unit 102 and an airlink 104 connecting subscriber unit 102 to a base station 106. Subscriber unit 102 is connected to a modem 108, a telephone 110, and a fax 112. The connection between subscriber unit 102 and modem 108, telephone 110, and fax 112 may be via a standard RJ-11 connection. Modem 108 is, in turn, connected to a computer 114. In other embodiments, subscriber unit 102 may be connected to a different number and/or a different combination of devices. For example subscriber unit 102 may be connected to one modem, to two telephones and three modems, to three faxes, to a fax and a modem, etc. Additionally, modem 108 may be connected to more than one computer.

Base station 106 is connected to a telephony switch 116, which in turn is connected to a Public Switched Telephone Network (PSTN) 120. Telephony switch 116 provides a link between base station 106 and PSTN 120. Base station 106 is also connected to a data service node 118, which in turn is connected to an external network 122, such as the Internet. Data service node 118 passes subscriber traffic between base station 106 and external network 122. In other embodiments, wireless communication system 100 may include multiple subscriber units.

Figure 2:
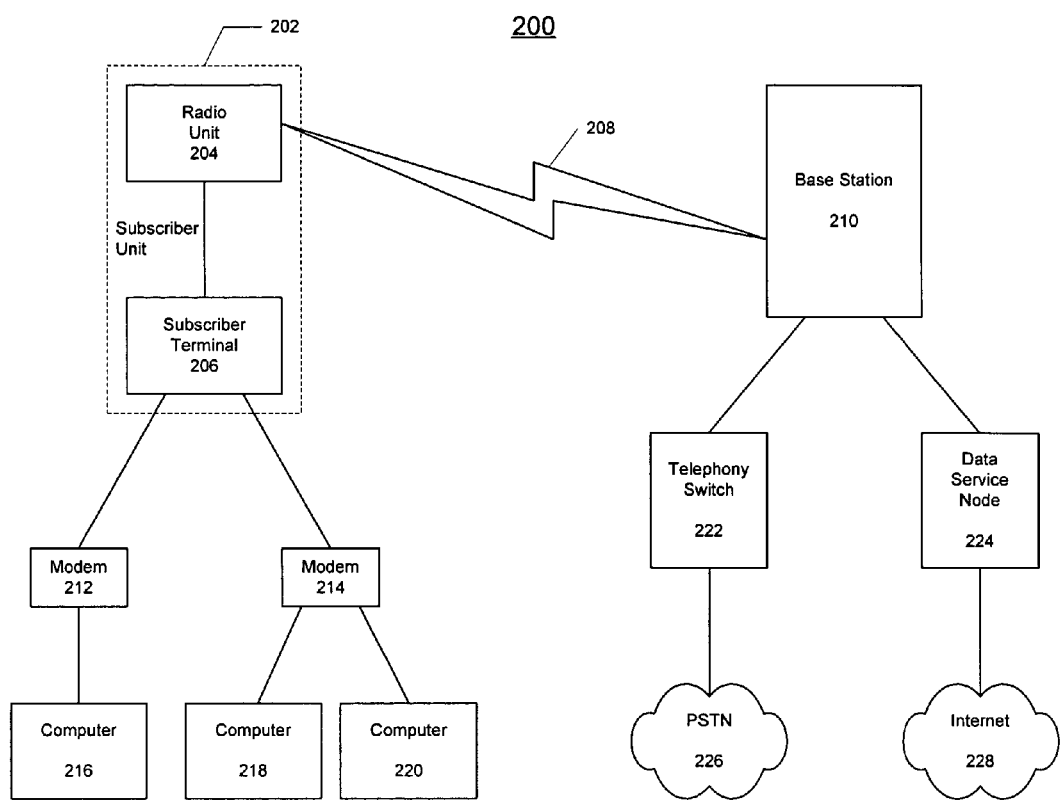
FIG. 2 illustrates a wireless communication system according to other embodiments of the invention.

In the embodiments of FIG. 2, subscriber unit 202 includes a radio unit 204 and a subscriber terminal 206. Subscriber terminal 206 is connected to modems 212 and 214. Modem 212 is connected to a computer 216 and modem 214 is connected to computers 218–220. Subscriber terminal 206 is connected to radio unit 204, which is in turn connected to a base station 210 via an airlink 208.

An airlink may include one or more wireless voice channels and one or more wireless broadband channels. The bandwidth of a wireless voice channel depends upon the voice coder (vocoder) that is used by the wireless communication system. Available voice coding technologies include, for example, G.726 (Adaptive Differential PCM (ADPCM) at 32 kbps), G.728 (Low-Delay CELP (LD-CELP) at 16 kbps), Global System for Mobile Enhanced Full Rate (GSM-EFR) (Algebraic CELP (ACELP) at 12.2 kbps), and G.729E (Conjunctive Structure ACELP (CS-ACELP) at 11.8 kbps). Although it is desirable to have high voice compression, higher bandwidth saving usually means lower voice quality. In order to compete with traditional wired communication systems, however, the audio quality in wireless communication systems must be on par with the toll quality in wired communication systems under all conditions. Hence, the vocoder selected for a wireless communication system may depend on factors such as audio quality, low bit rate, robustness, delay, and ease of implementation.

A wireless communication system may be line-of-sight (LOS) based, non-line-of-sight (NLOS) based, or a combination of the two. In a LOS-based system, a signal travels a direct and unobstructed path from a transmitter to a receiver. In a NLOS-based system, a signal reaches the receiver through reflections, scattering, and diffractions. The signal arriving at the receiver consists of components from the direct path, multiple reflected paths, scattered energy, and diffracted propagation. These energy components have different delay spreads, attenuation, and stability relative to the direct path.

The decision of whether to employ a LOS technology, NLOS technology, or a combination of the two technologies depends upon several factors. Since employing LOS technology usually requires installation of very tall radio towers, local ordinances may need to be taken into consideration. In addition, possible obstructions from man-made objects in the area and the natural terrain of the area may also need to be taken into consideration. Other factors may include delay spread, which occurs when an impulse signal is transmitted and multipath scattering causes multiple signal echoes to arrive at the receiver at different times, fading, which may impact performance as a result of bit errors, ease of installation, interference, path loss, and the frequency in which the wireless communication system will operate.

A wireless communication system may employ one or more of many different airlink technologies, such as code division multiple access (CDMA), orthogonal frequency division multiplexing (OFDM), time division multiple access (TDMA), and frequency division multiple access (FDMA). The reasons that are cited for the selection of one technology over the other may include capability of the technology to support high rate multimedia services, efficient use of spectrum, ability to support a large number of users, and robustness to multipath.

Spectral efficiency measures how much information a system can pack into a given frequency bandwidth. A wireless system with high spectral efficiency has a higher upper capacity and throughput limit than one with lower spectral efficiency. Here, spectral efficiency is defined by Equation 1.

$$\eta = \frac{R_d}{B_{RF}} \text{ bits/s/Hz} \quad [1]$$

where $R_d$ is the transmitter data rate and $B_{RF}$ is the system bandwidth.

The fundamental principle behind CDMA is to allow multiple users to share the same spectrum by spreading the information data across the operating frequency band. In direct sequence CDMA (DS-CDMA), this is achieved by applying a unique code signal, in the form of a chip sequence, to each user's data. This code has a higher bit rate than that of the user's data and effectively spreads the information bandwidth to fill the operating frequency band. The intended recipient cross-correlates the received signal with a synchronized replica of the code signal to retrieve the original information signal. Other users sharing the band appear as interference noise. The interference level depends on the cross-correlation property of the spreading codes. The spreading and dispreading process imparts a spreading gain to the user data equal to the ratio of the radio frequency (RF) bandwidth to the bandwidth of the original signal. The effect of spreading and dispreading is to increase the system gain on the desired signal and to render other users' signals as noise.

In FDMA schemes, the spectrum is divided into frequency bands. Each user is allocated one or more frequency bands. With TDMA schemes, the spectrum is shared by allowing each user to use the full spectrum for a short period of time, referred to as a timeslot. Typically, the timeslots are grouped into a number of timeslots, called a frame. A user is then assigned one or more timeslots that periodically appear in a frame.

OFDM is a multicarrier communication system in which the frequency band is composed of a number of narrowband carriers. Each carrier is modulated with a symbol and multiplexed with other carriers. The carriers are modulated and demodulated using the Inverse Fast Fourier Transform (IFFT) and Fast Fourier Transform (FFT) in OFDM transmitters and receivers. OFDM has excellent spectral efficiency as a result of the close spacing attainable because of the mutual orthogonality of the carriers. The FFT operation creates carriers with sidebands that overlap with no mutual interference and thus allows OFDM carriers to be efficiently packed within the operating band. An OFDM system typically multiplexes multiple users onto the operating band by allocating users to subsets of carriers. Additional information on OFDM can be found in U.S. Pat. No. 6,359,923, issued Mar. 19, 2002, which is incorporated herein by reference in its entirety for all purposes.

Figure 3:
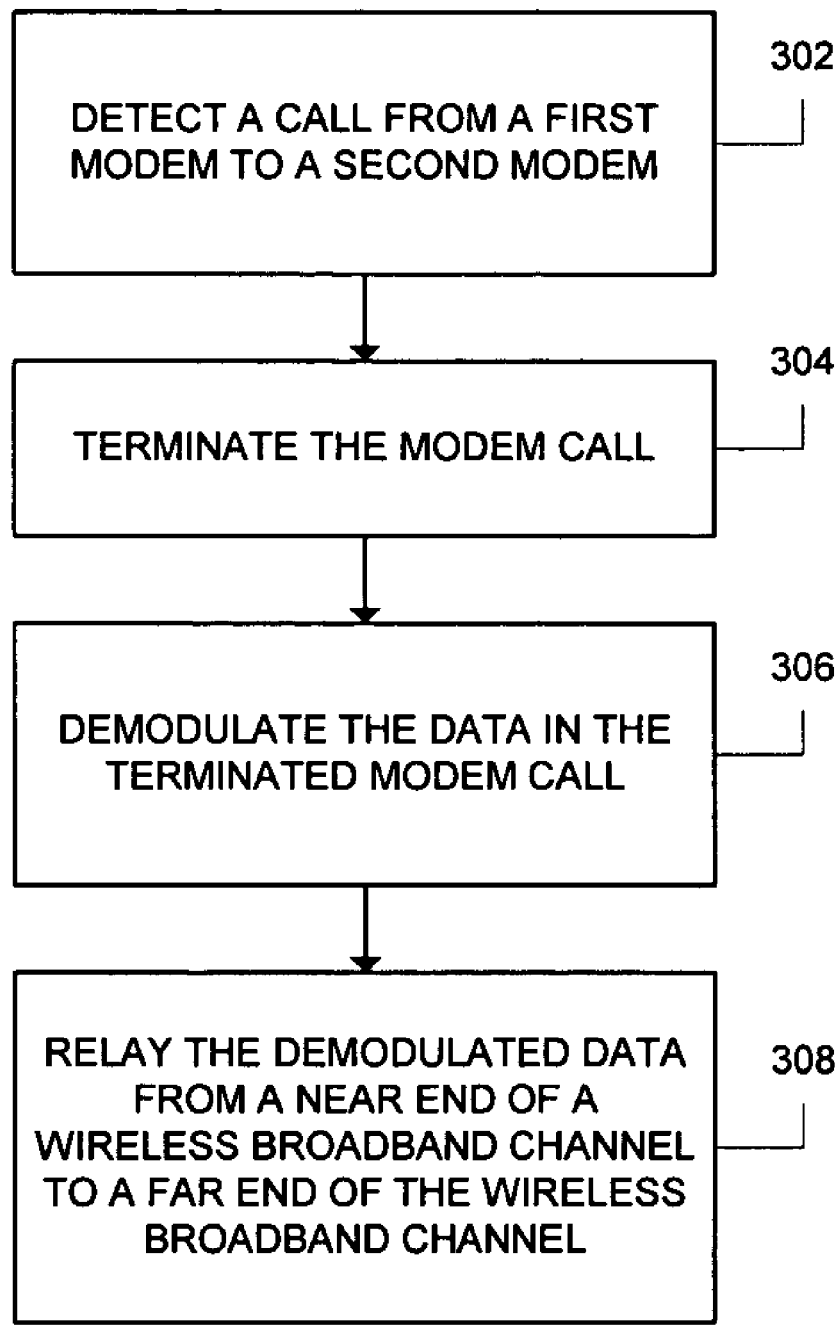
FIG. 3 depicts a process flow of a method of supporting voice-band modem-to-modem calls in a wireless communication system according to some embodiments of the invention.

FIG. 3 illustrates exemplary methods of supporting voice-band modem-to-modem calls in a wireless communication system. In these embodiments, when a call from a first modem to a second modem is detected (302), the modem call is terminated (i.e., a modem-to-modem communication session is established) (304). Data in the terminated modem call is then demodulated (306) and the demodulated data is relayed from a near end of a wireless broadband channel to a far end of the wireless broadband channel (308).

Figure 4:
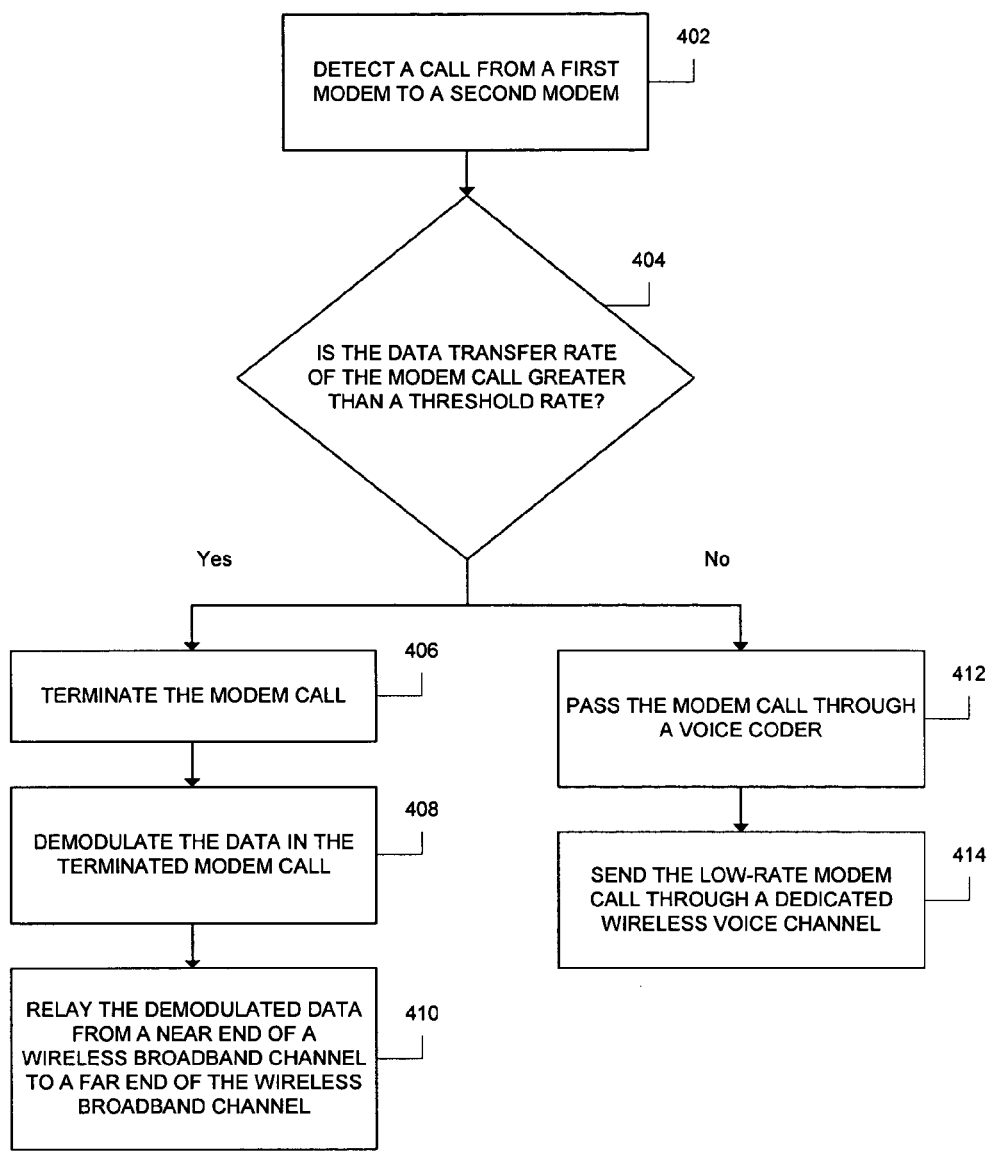
FIGS. 4–6 show different methods of supporting voice-band modem-to-modem calls in a wireless communication system according to some embodiments of the invention.

FIG. 4 shows other methods of supporting voice-band modem-to-modem calls in a wireless communication system. A call from a first modem to a second modem is detected at 402. At 404, a determination is made as to whether the data transfer rate of the modem call is greater than a threshold rate, for example 1.2 kbps. If the data transfer rate is greater than the threshold rate, then the modem call is terminated (406), data in the terminated modem call is demodulated (408), and the demodulated data is relayed from a near end of a wireless broadband channel to a far end of the wireless broadband channel (410). If the data transfer rate of the modem call is less than or equal to the threshold rate, then the modem call is passed through a voice coder (412) and sent through a dedicated wireless voice channel (414).

Figure 5:
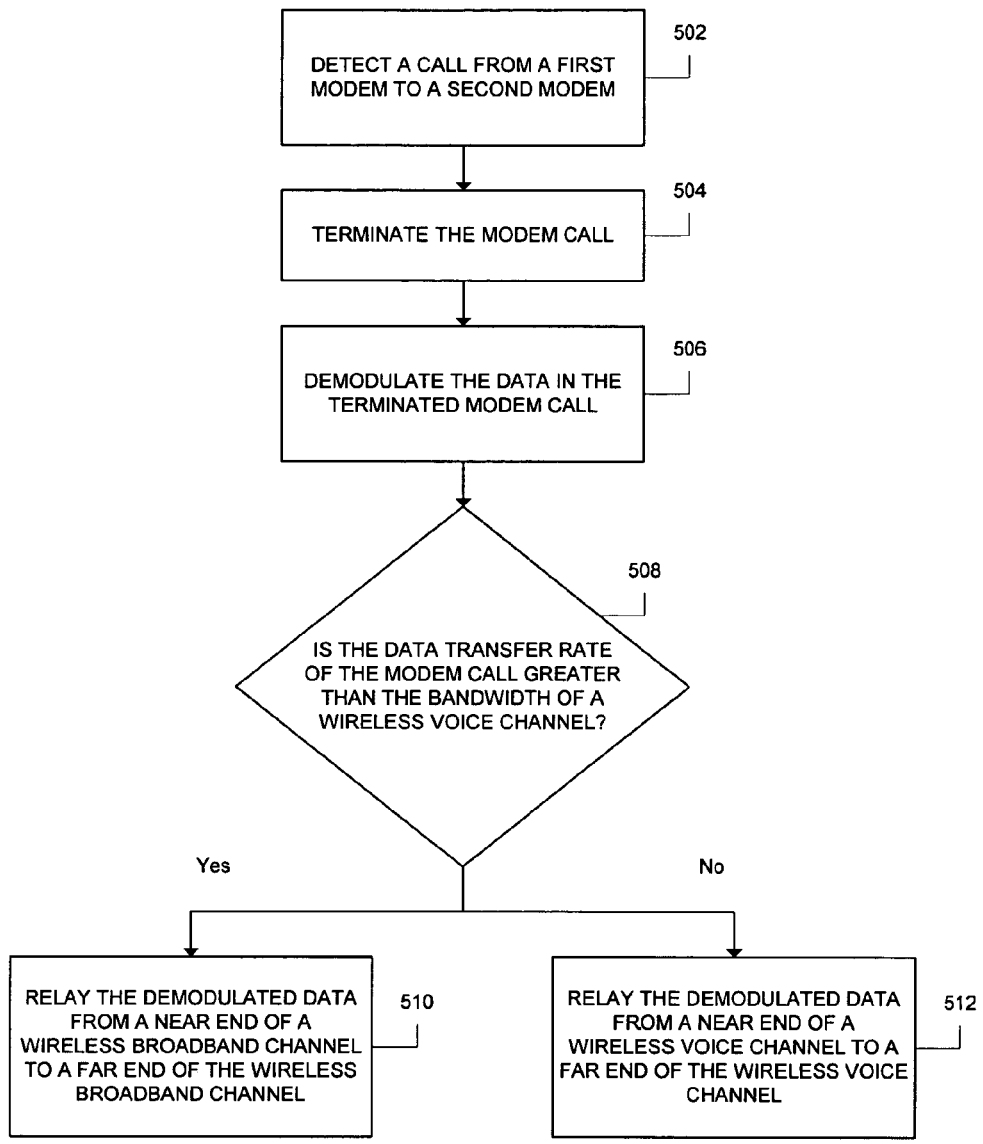

Additional methods of supporting voice-band modem-to-modem calls in a wireless communication system are depicted in FIG. 5. At 502, a call from a first modem to a second modem is detected. The modem call is then terminated (504) and data in the terminated call is demodulated (506). A determination is made as to whether the data transfer rate of the modem call is greater than the bandwidth of a wireless voice channel (508). In some embodiments, bandwidth refers to the data throughput supported by the wireless voice channel. If the data transfer rate is greater than the bandwidth of a wireless voice channel, then the demodulated data is relayed from a near end of a wireless broadband channel to a far end of the wireless broadband channel (510). If the data transfer rate of the modem call is less than or equal to the bandwidth of a wireless voice channel, then the demodulated data is relayed from a near end of a dedicated wireless voice channel to a far end of the dedicated wireless voice channel (512).

Figure 6:
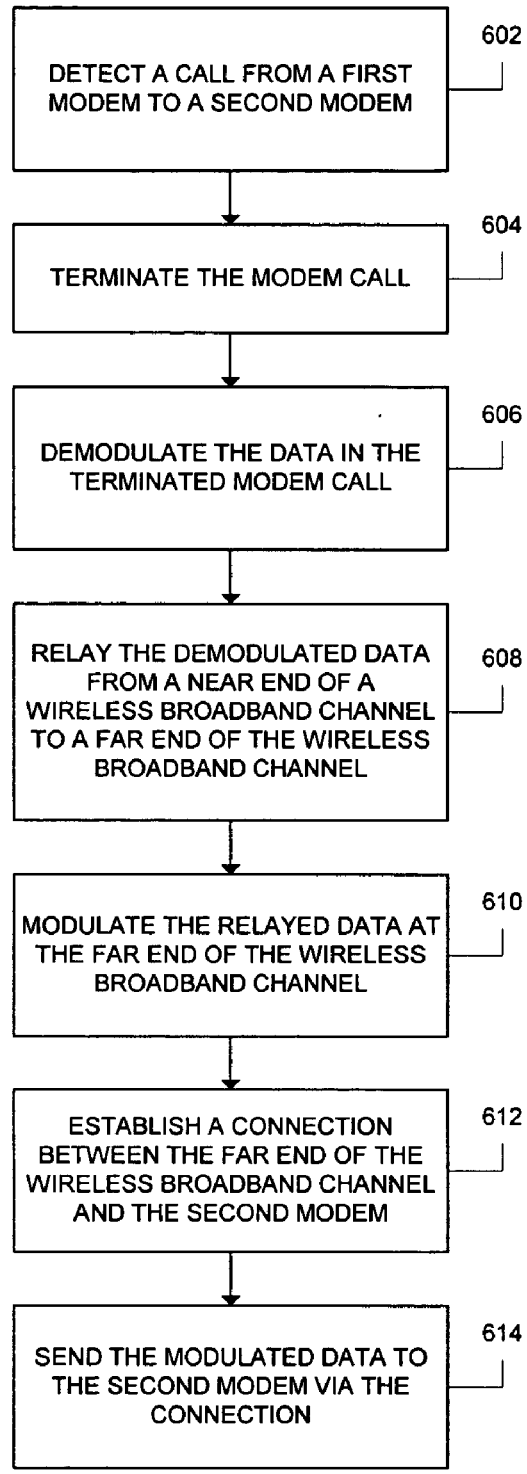

A method of supporting voice-band modem-to-modem calls in a wireless communication system according to further embodiments of the invention is illustrated in FIG. 6. At 602, a call from a first modem to a second modem is detected. The call is terminated at 604. Data in the terminated modem call is demodulated (606) and relayed from a near end of a wireless broadband channel to a far end of the wireless broadband channel (608). The relayed data is then modulated at the far end of the wireless broadband channel (610). A connection is established between the far end of the wireless broadband channel and the second modem (612) and the modulated data is sent to the second modem via the connection (614).

Figure 7:
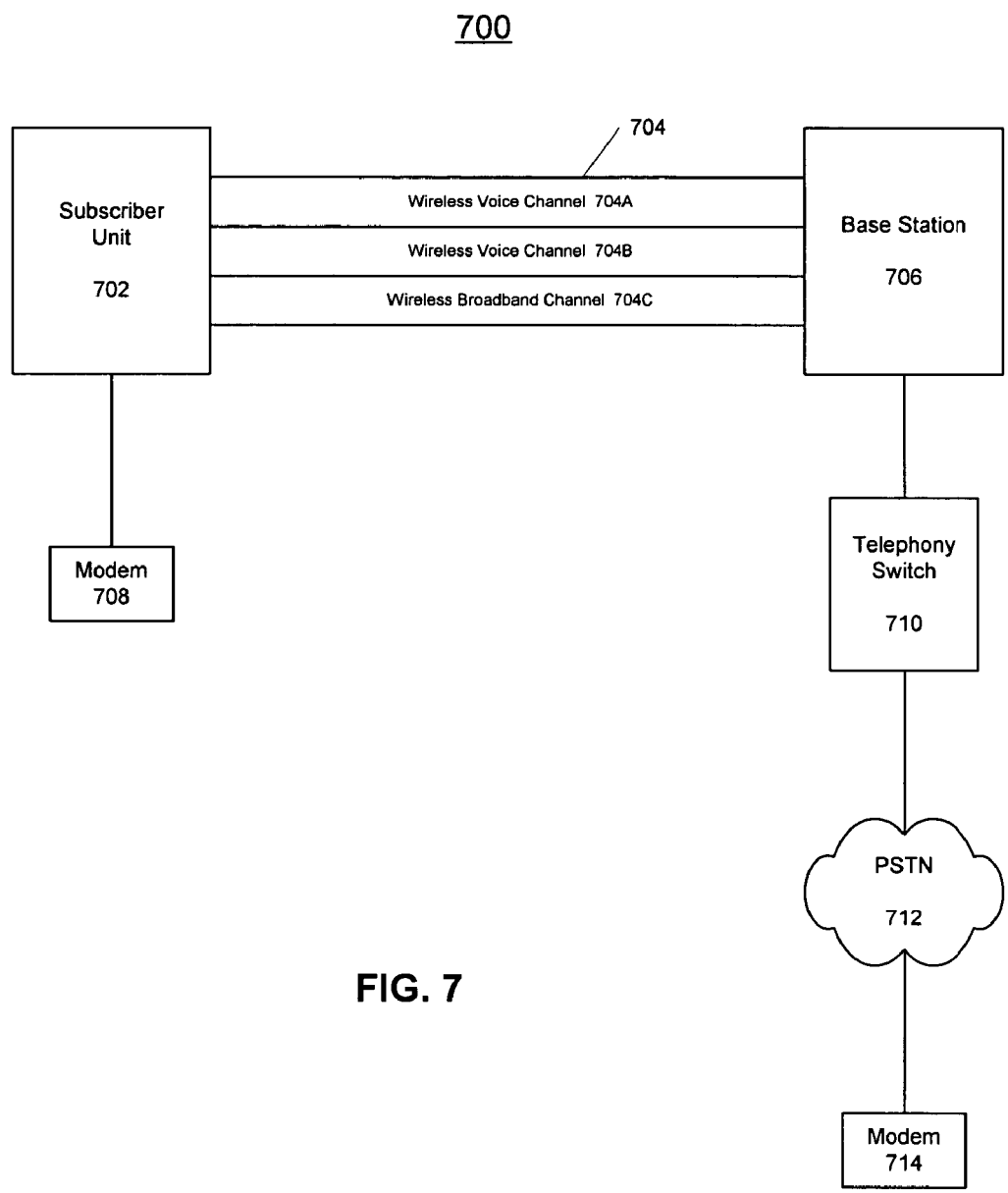
FIGS. 7–9 illustrate examples of wireless communication systems that support voice-band modem-to-modem calls according to some embodiments of the invention.

Examples of a wireless communication system 700 that supports voice-band modem-to-modem calls are depicted in FIG. 7. Wireless communication system 700 includes a subscriber unit 702 and a base station 706 connected via an airlink 704. In these embodiments, airlink 704 is divided into three channels, two wireless voice channels 704A and 704B and a wireless broadband channel 704C. In some embodiments, wireless broadband channel 704C is not used to transmit voice calls. In other embodiments, wireless voice channels 704A and 704B are circuit-switched and wireless broadband channel 704C is packet switched. Airlink 704 in other embodiments may have more or less channels and/or different number of voice and broadband channels.

When modem 708 places a call to modem 714, either subscriber unit 702 or base station 706 detects that it is a modem call and determines the rate of the modem connection. The rate of the modem connection depends upon the modulation standard used by modems 708 and 714. For example, a V.32 modem can transfer data up to a rate of 9.6 kbps, a V.32bis modem can transfer data up to a rate of 14.4 kbps, a V.34bis modem can transfer data up to a rate of 33.6 kbps, and a V.90 modem can transfer data up to a rate of 56 kbps. If the data transfer rate of the modem call is less than or equal to a threshold rate, then one of the wireless voice channels 704A or 704B is assigned to the call. The call is then passed through a voice coder at subscriber unit 702 and sent over the assigned channel to base station 706. In one embodiment, the assigned channel is dedicated to the call, i.e., the channel is not used for any other calls for the duration of the modem call. Base station 706 then decodes the call, transfers the call to telephony switch 710, which is then forwards the call through PSTN 712 to modem 714.

If the rate of the modem call between modems 708 and 714 is greater than the threshold rate, then the modem session being established by modem 708 is terminated at subscriber unit 702. A modem at subscriber unit 702 would in essence be acting as modem 714 would in a traditional voice-band modem-to-modem call, e.g., it answers the calls and then demodulates the data in the modem calls. When the data transfer rate of the modem call is less than or equal to the bandwidth of wireless voice channels 704A and 704B in airlink 704, the demodulated data is relayed over one of the wireless voice channels 704A or 704B to base station 706. Otherwise, the demodulated data is relayed over wireless broadband channel 704C in airlink 704 to base station 706. Data from other modem calls may be relayed over wireless broadband channel 704C at the same time, i.e., wireless broadband channel 704C may not be dedicated to the call.

A connection between base station 706 and modem 714 is established, e.g., a modem in base station 706 negotiates a connection with modem 714 through telephony switch 710 and PSTN 712. The modem in base station 706 will re-modulate the relayed data and the re-modulated data will be sent to modem 714 via the connection between base station 706 and modem 714. Thus, the modem at base station 706 is essentially acting as modem 708 would in a traditional voice-band modem-to-modem call.

Figure 8:
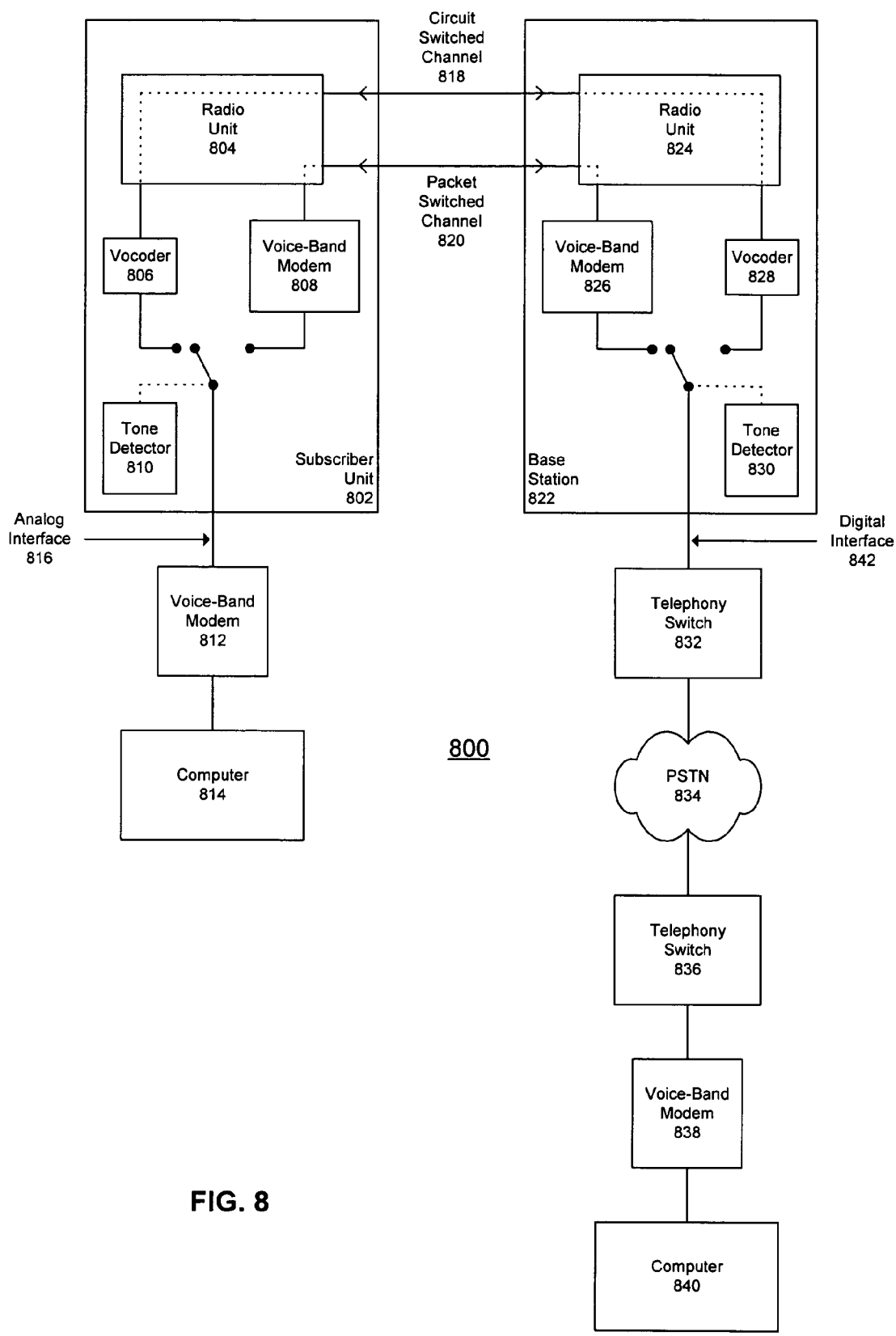

FIG. 8 illustrates examples of a wireless communication system 800 that supports voice-band modem-to-modem calls. Wireless communication system 800 includes a subscriber unit 802 and a base station 822. Subscriber unit 802 includes a radio unit 804, a vocoder 806, a voice-band modem 808, and a tone detector 810. Base station 822 includes a radio unit 824, a voice-band modem 826, a vocoder 828, and a tone detector 830. Subscriber unit 802 and base station 822 communicate via two wireless airlink channels 818–820. In these embodiments, wireless airlink channel 818 is circuit-switched and wireless airlink channel 820 is packet switched.

Wireless communication system 800 also includes a voice-band modem 812 connected to a computer 814 and linked to subscriber unit 802 via an analog interface 816. Analog interface 816 may be a plain old telephone service (POTS) line. Wireless communication system 800 further includes a telephony switch 832 linked to base station 822 via a digital interface 842 that may include multiple channels that allow for transmissions of data at speeds of up to 64 kbps. Telephone switch 832 is connected to a PSTN 834, which in turn is connected to another telephony switch 836. A voice-band modem 838 is connected to telephony switch 836 and a computer 840.

When voice-band modem 812 calls voice-band modem 838, the call is initially routed over circuit switched wireless airlink channel 818. Once tone detector 830 at base station 822 detects answering tone(s) generated by modem 838, voice-band modem 826 at base station 822 acts as a calling modem and establishes a modem session with modem 838. In some embodiments, base station 822 may send an indication that a modem call has been detected back to subscriber unit 802. In other embodiments, tone detector 810 at subscriber unit 802 may also detect the answering tone(s) from modem 838. Voice-band modem 808 at subscriber unit 802 acts as an answering modem and establishes a modem session with modem 812. Modem 808 then demodulates the data received from modem 812 and the demodulated data is relayed over packet switched wireless airlink channel 820 to base station 822.

At base station 822, modem 826 re-modulates the data from subscriber unit 802 and sends the remodulated data to modem 838 via digital interface 842, telephony switch 832, PSTN 834, and telephony switch 836. Data from modem 838 is demodulated by modem 826 at base station 822 and relayed over wireless airlink channel 820 to subscriber unit 802. Modem 808 then re-modulates the data and forwards it onto modem 812 via analog interface 816. While the modem relay session is taking place, wireless airlink channel 818 may be allocated to another voice call. The link between modem 812 and modem 838 is transparent. In other words, modems 812 and 838 are unaware of the presence of subscriber unit 802 or base station 822.

When voice-band modem 838 places a call to voice-band modem 812, subscriber unit 802 and base station 822 functions in similar fashion as above, except tone detector 810 at subscriber unit 802 detects answering tone(s) from modem 812 instead. In some embodiments, tone detector 830 at base station 822 may also detect the answering tone(s) generated by modem 812. Additionally, subscriber unit 802 may send an indication back to base station 822 that a modem call has been detected. Voice-band modem 808 at subscriber unit 802 then acts as a calling modem rather than an answering modem and voice-band modem 826 at base station 822 acts as an answering modem rather than a calling modem.

Figure 9:
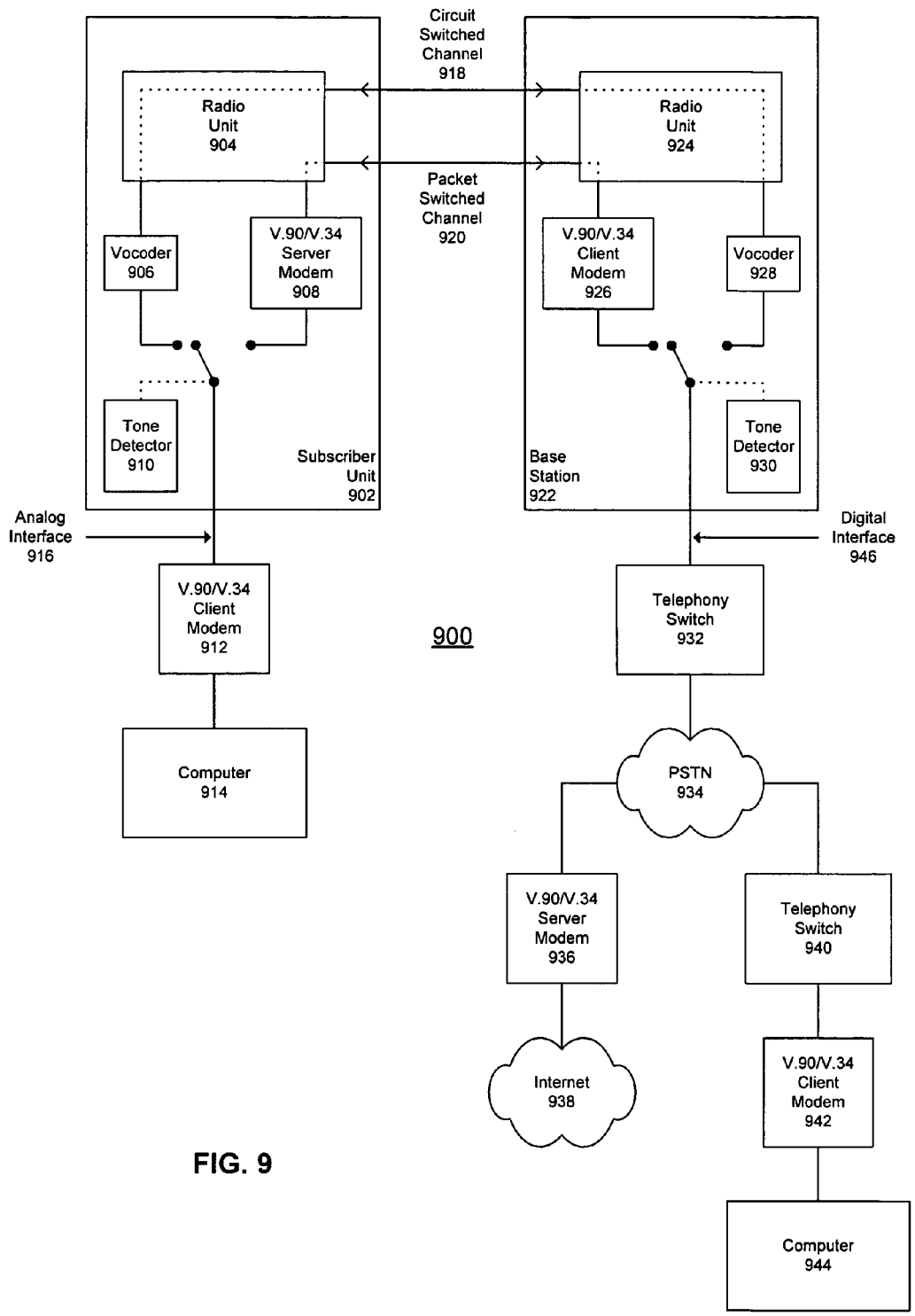

FIG. 9 shows examples of a wireless communication system 900 that supports voice-band modem-to-modem calls. Wireless communication system 900 includes a subscriber unit 902 and a base station 922. Subscriber unit 902 includes a radio unit 904, a vocoder 906, a V.90/V.34 server modem 908, and a tone detector 910. In addition, wireless communication system 900 includes a V.90/V.34 client modem 912 that is connected to a computer 914 and linked to subscriber unit 902 via an analog interface 916, which may be a POTS line.

Base station 922 includes a radio unit 924, a V.90/V.34 client modem 926, a vocoder 928, and a tone detector 930. Base station 922 is linked to subscriber unit 902 via two wireless airlink channels 918–920. In these embodiments, wireless airlink channel 918 is circuit switched and wireless airlink channel 920 is packet switched. Wireless communication system 900 also includes a telephony switch 932 that is linked to base station 922 via a digital interface 946. Digital interface 946 may include multiple channels that allow for transmissions of data at speeds of up to 64 kbps. Telephony switch 932 is connected to a PSTN 934, which in turn is connected to a telephony switch 940 and a V.90/V.34 server modem 936. Telephony switch 940 is linked to a V.90/V.34 client modem 942 and V.90/V.34 server modem 936 is linked to Internet 938. V.90/V.34 client modem 942 is connected to a computer 944.

When client modem 912 places a call to client modem 942, the call is initially routed over circuit switched wireless airlink channel 918. Once tone detector 930 at base station 922 detects answering tone(s) generated by client modem 942, client modem 926 at base station 922 acts as a calling modem and establishes a modem session with client modem 942. Since both modem 926 and modem 942 are V.90/V.34 client modems, the modems will negotiate using the V.34 protocol. In some embodiments, base station 922 may send an indication that a modem call has been detected back to subscriber unit 902. In other embodiments, tone detector 910 at subscriber unit 902 may also detect the answering tone(s) from client modem 942.

Server modem 908 at subscriber unit 902 then acts as an answering modem and establishes a modem session with client modem 912. Since modem 908 is a V.90/V.34 server modem and modem 912 is a V.90/V.34 client modem, the V.90 protocol will be used for data sent from modem 908 to modem 912 and the V.34 protocol will be used for data sent from modem 912 to modem 908. At subscriber unit 902, server modem 908 demodulates data received from client modem 912 and relays the demodulated data over packet switched wireless airlink channel 920 to base station 922. At base station 922, client modem 926 re-modulates the received data and sends the remodulated data to client modem 942 via digital interface 946, telephony switch 932, PSTN 934, and telephony switch 940.

Data from client modem 942 is demodulated by client modem 926 at base station 922 and sent over wireless airlink channel 920 to subscriber unit 902. Server modem 908 then re-modulates the data and passes it onto client modem 912 via analog interface 916. During the modem relay session between client modems 912 and 942, wireless circuit switched airlink channel 918 can be used for another voice call. The link between client modems 912 and modem 942 may be transparent, i.e., client modems 912 and 942 may not be aware of the presence of subscriber unit 902 or base station 922.

In the case where client modem 912 places a call to server modem 936, the call will initially be routed over circuit switched wireless airlink channel 918. Tone detector 930 at base station 922 will detect answering tone(s) generated by server modem 936, the answering modem. Once detected, client modem 926 at base station 922 will act as a calling modem and establish a modem session with server modem 936. Since modem 936 is a V.90/V.34 server modem and modem 926 is a V.90/V.34 client modem, the V.90 protocol will be used for data sent from modem 936 to modem 926 and the V.34 protocol will be used for data sent from modem 926 to modem 936. In some embodiments, base station 922 will send an indication back to subscriber unit 902 that a modem call has been detected. In further embodiments, tone detector 910 at subscriber unit 902 will also detect the answering tone(s) from server modem 936.

Server modem 908 at subscriber unit 902 will act as an answering modem and establish a modem session with client modem 912. As before, the V.90 protocol will be used for data sent from modem 908 to modem 912 and the V.34 protocol will be used for data sent from modem 912 to modem 908 since modem 908 is a V.90/V.34 server modem and modem 912 is a V.90/V.34 client modem. At subscriber unit 902, server modem 908 will demodulate any data received from client modem 912 and relay the demodulated data over wireless packet switched airlink channel 920 to base station 922. Client modem 926 at base station 922 will re-modulate the data and forward it onto server modem 936 via digital interface 946, telephony switch 932, and PSTN 934.

Data received from server modem 936 will first be demodulated by client modem 926 at base station 922. The demodulated data will then be relayed over packet switched wireless airlink channel 920 to subscriber unit 902. Server modem 908 at subscriber unit 902 will re-modulate the data and pass it onto client modem 912 via analog interface 916. As with some of the examples above, wireless circuit switched wireless airlink channel 918 can be used for another voice call during the modem relay session. In addition, the link between server modem 936 and client modem 912 may be transparent, i.e., modems 912 and 936 may be unaware of the presences of subscriber unit 902 and base station 922.

If client modem 942 or server modem 936 had placed a call to client modem 912 instead of the other way around, subscriber unit 902 and base station 922 would function in a similar fashion as above, except tone detector 910 at subscriber unit 902 would detect answering tone(s) generated by client modem 912 rather than tone detector 930 at base station 922 detecting answering tone(s) generated by client modem 942 or server modem 936. In some embodiments, tone detector 930 at base station 922 may also the detect answering tone(s) from client modem 912. Additionally, subscriber unit 902 may send an indication that a modem call has been detected back to base station 922. Server modem 908 at subscriber unit 902 would act as a calling modem rather than an answering modem and client modem 926 at base station 922 would act as an answering modem rather than a calling modem.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A wireless communication system comprising:
   a wireless voice channel having a near end and a far end;
   a wireless broadband channel having the same near end and the same far end as the wireless voice channel;
   a first modem linked to the near end of the wireless voice and broadband channels;
   a second modem linked to the far end of the wireless voice and broadband channels;
   a third modem located at the near end of the wireless voice and broadband channels and configured for, in response to a detection of a modem call over the wireless voice channel, establishing a connection with the first modem, receiving data from the first modem over the connection, and demodulating the received data; and
   a first radio unit located at the near end of the wireless voice and broadband channels and configured for relaying the demodulated data over the wireless broadband channel.

2. The system of claim 1 wherein the wireless communication system further comprises:
   a second radio unit located at the far end of the wireless voice and broadband channels and configured for receiving the relayed data from the wireless broadband channel;
   a fourth modem located at the far end of the wireless voice and broadband channels and configured for modulating the received relayed data, establishing a connection with the second modem, and transmitting the modulated data to the second modem over the connection.

3. The system of claim 1 wherein the wireless voice channel is a dedicated wireless voice channel.

4. The system of claim 1 further comprising a tone detector configured for detecting the modem call.

5. The system of claim 1 further comprising a subscriber unit and a base station, one of which includes the third modem and the first radio unit, and another of which includes the fourth modem and the second radio unit.

6. The system of claim 2 wherein the third modem establishes a connection with the first modem by answering a modem call from the first modem, and the fourth modem establishes a connection with the second modem by placing a modem call to the second modem.

7. A method of supporting voice-band modem-to-modem calls in a wireless communication system, the method comprising:
   detecting a call from a first modem to a second modem over a wireless voice channel;
   determining a data transfer rate of the detected modem call;
   comparing the data transfer rate to a bandwidth of the wireless voice channel; and
   if the data transfer rate is greater than the bandwidth of the wireless voice channel:
      establishing a connection with the first modem;
      receiving data from the first modem over the connection;
      demodulating the received data; and
      relaying the demodulated data from a near end of a wireless broadband channel to a far end of the wireless broadband channel.

8. The method of claim 7 further comprising:
   comparing the data transfer rate to a threshold rate that is less than the bandwidth of the wireless voice channel; and
   if the data transfer rate is between the threshold rate and the bandwidth of the wireless voice channel:
      establishing a connection with the first modem;

receiving data from the first modem over the connection;

demodulating the received data; and relaying the demodulated data from a near end of the wireless voice channel to a far end of the wireless voice channel.

9. The method of claim 8 further comprising maintaining the modem call over the wireless voice channel if the data transfer rate is equal to or less than the threshold rate.

10. The method of claim 7 further comprising:

receiving the relayed data at the far end of the wireless broadband channel;

modulating the received data;

establishing a connection with the second modem; and transmitting the modulated data to the second modem via the connection.

11. The method of claim 10 wherein establishing connection with the first modem comprises answering a modem call from the first modem, and establishing the connection with the second modem comprises placing a modem call to the second modem.

12. The method of claim 7 wherein the wireless broadband channel is not used for voice calls.

13. The method of claim 7 wherein the wireless broadband channel is packet switched, and the wireless voice channel is circuit switched.

14. The method of claim 7 wherein detecting the modem call comprises detecting tones.

15. The method of claim 7 wherein one of a subscriber unit and a base station relays the modulated data and another of the subscriber unit and the base station receives the modulated data.

16. The method of claim 7 further comprising terminating the modem call over the wireless voice channel prior to establishing the connection between the near end of the wireless broadband channel and the first modem.

17. The method of claim 7 wherein the wireless broadband channel is located between the first modem and second modem.

18. The method of claim 7 wherein the wireless voice channel is dedicated to the modem call.

19. The method of claim 7 wherein the connection is established between the near end of the wireless broadband channel and the first modem.

20. The method of claim 7 wherein the modem call is detected at a near end of the wireless voice channel.

21. The method of claim 7 wherein the modem call is detected at a far end of the wireless voice channel.

22. A wireless communication system comprising:

a wireless voice channel having a near end and a far end;

a wireless broadband channel having the same near end and the same far end as the wireless voice channel;

a first modem linked to the near end of the wireless voice and broadband channel;

a second modem linked to the far end of the wireless voice and broadband channels;

a processor configured for determining a data transfer rate of a modem call from the first modem to the second modem over the wireless voice channel, and comparing the data transfer rate to a wireless voice channel;

a third modem located at the near end of the wireless voice and broadband channels and configured for establishing a connection with the first modem, receiving data from the first modem over the connection, and demodulating the received data if the data transfer rate is greater than the bandwidth of the wireless voice channel; and a first radio unit located at the near end of the wireless voice and broadband channels and configured for relaying the demodulated data over the wireless broadband channel if the data transfer rate is greater than the bandwidth of the wireless voice channel.

23. The system of claim 22, wherein:

the processor is configured for comparing the data transfer rate to a threshold rate that is less than the bandwidth of the wireless voice channel;

the third modem is configured for establishing a connection between a near end of the wireless voice channel and the first modem, receiving data from the first modem over the connection, and demodulating the received data if the data transfer rate is between the threshold rate and the bandwidth of the wireless voice channel; and the first radio unit is configured for relaying the demodulated data from the near end of a wireless voice channel to a far end of wireless voice channel if the data transfer rate is between the threshold rate and the bandwidth of the wireless voice channel.

24. The system of claim 23 further comprising a vocoder for maintaining the modem call over the wireless voice channel if the data transfer rate is equal to or less than the threshold rate.

25. The system of claim 24 wherein the wireless communication system further comprises:

a second radio unit located at the far end of the wireless voice and broadband channels and configured for receiving the relayed data from the wireless broadband channel;

a fourth modem located at the far end of the wireless voice and broadband channels and configured for modulating the received relayed data, establishing a connection with the second modem, and transmitting the modulated data to the second modem over the connection.

26. The system of claim 22 wherein the wireless voice channel is a dedicated wireless voice channel.

27. The system of claim 22 further comprising a tone detector configured for detecting the modem call.

28. The system of claim 22 further comprising a subscriber unit and a base station, one of which includes the third modem and the first radio unit, and another of which includes the fourth modem and the second radio unit.

29. The system of claim 23 wherein the third modem establishes a connection with the first modem by answering a modem call from the first modem, and the fourth modem establishes a connection with the second modem by placing a modem call to the second modem.

30. A communication system comprising:

a wireless broadband channel having a near end and a far end;

a first voice-band modem linked to the near end of the wireless broadband channel, wherein the first voice-band modem comprises a V.32 modem, a V.32 b model, a V.34 modem, a V.34 b modem, or a V.90 modem;

a second voice-band modem linked to the far end of the wireless broadband channel;

a third modem located at the near end of the wireless broadband channel and configured for, in response to a detection of a modem call over the wireless broadband channel, establishing a connection with the first voice-band modem, receiving data from the first voice-band modem over the connection, and demodulating the received data; and a first radio unit located at the near end of the wireless broadband channel and configured for relaying the demodulated data over the wireless broadband channel.

31. The system of claim 30, further comprising:

a second radio unit located at the far end of the wireless broadband channel and configured for receiving the relayed data from the wireless broadband channel;

a fourth modem located at the far end of the wireless broadband channel and configured for modulating the received relayed data, establishing a connection with the second voice-band modem, and transmitting the modulated data to the second voice-band modem over the connection.

32. The system of claim 31, wherein the third and the fourth modems are voice-band modems.

33. The system of claim 30, further comprising a tone detector configured for detecting the modem call.

34. The system of claim 30, wherein the first voice-band modem is configured to receive an analog signal.

35. The method of claim 7, wherein the first modem comprises a V.32 modem, a V.32 b model, a V.34 modem, a V.34 b modem, or a V.90 modem.

36. The system of claim 22, wherein the first modem comprises a V.32 modem, a V.32 b model a V.34 modem, a V.34 b modem, or a V.90 modem.

* * * * *